Jas. Thornton. & E. G. Latta.

Hold-back Attachment.

No. 122,078.   Patented Dec. 19, 1871.

Witnesses:
Lansing Perrine.
W. H. Finckel.

Inventors:
James Thornton and
Emmit G. Latta,
by Geo. W. Rothwell,
Attorney.

UNITED STATES PATENT OFFICE.

JAMES THORNTON AND EMMIT G. LATTA, OF GENESEE, NEW YORK.

IMPROVEMENT IN HOLD-BACK ATTACHMENTS TO VEHICLES.

Specification forming part of Letters Patent No. 122,078, dated December 19, 1871; antedated December 9, 1871.

*To all whom it may concern:*

Be it known that we, JAMES THORNTON and EMMIT G. LATTA, both of Genesee, in the county of Allegany and State of New York, have invented a new and useful Improvement in Hold-Back Attachments; and we do hereby declare the following to be a full, clear, and exact description thereof, sufficient to enable those skilled in the art to which our invention appertains to fully understand and to make and use the same, reference being had to the accompanying drawing forming part of this specification, and in which—

Figure 1:
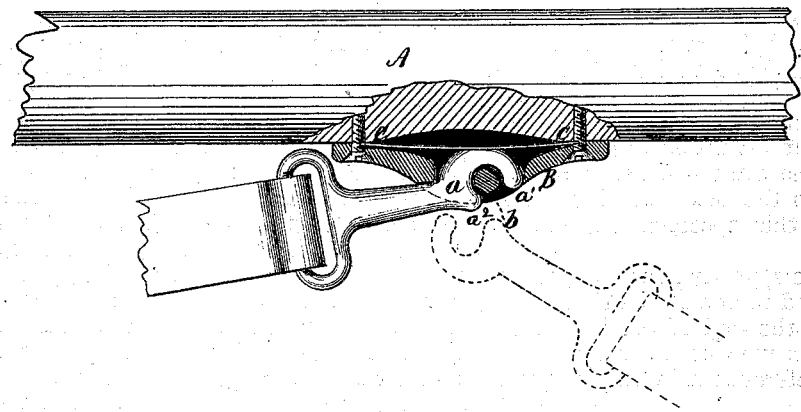
Figure 2:
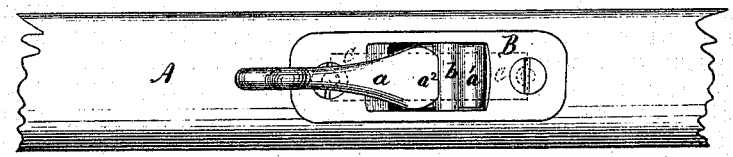

Figure 1 is a side view, partly in section, showing the socket attached to one of the thills, and the hook secured to the end of the hold-back strap. Fig. 2 is a plan view of the same.

Similar letters of reference indicate like parts in the two figures.

Our invention relates to that class of hold-back attachments which consist of a hook secured to the end of the hold-back strap, and a socket with which said hook engages, affixed to the thill of the carriage or other vehicle. The invention consists in the peculiar construction of the hook and socket, the latter being provided with a cross-bar with which the open hook engages, as hereinafter more fully described.

We will now proceed to set forth our invention in detail.

Referring to the drawing, A represents one of the thills or shafts of a carriage or other vehicle. To each thill or shaft is secured, by means of screws or in any other suitable way, a socket, B, of metal. This socket is cast in about the form shown in the drawing, and has an opening to receive the end of the hook $a$ attached to one end of the hold-back strap, a portion of which is represented in Fig. 1. Across the opening in the socket, and situated within it, is cast a rounded bar, $b$. This bar is located a little to one side of the center of the opening in the socket, as clearly shown, so that the hook can only be inserted in one direction. It will be noticed that one edge of the opening in the socket (that over which the hook is inserted) is rounded, while the other is beveled and the curved end of the hook wedges against it. Within the socket B is placed a flat spring, $c$, which is retained in place by the screws which secure the socket, the spring being formed with a semicircular recess in each end to fit the screws, as shown by dotted lines in Fig. 2, and full lines in Fig. 1. There is a shallow recess in the wood beneath the spring to allow the latter slight play, or rather to permit its depression when the hook is inserted. The hook $a$ is made of the form shown in the drawing, but there are certain peculiarities to which it may be well to direct attention particularly. It will be seen that the rounded surfaces $a^1$ and $a^2$ approach each other so nearly that the hook can only be engaged with the socket by first inserting the end $a^1$ and then turning the hook down to the position shown in full lines in Fig. 1. Another feature is that the surface which comes in contact with the spring is flat, (see Fig. 1,) so that the spring has an extended bearing, and is thereby enabled to retain the hook in place. At the outer end of the shank of the hook is formed a loop in which the strap is secured.

The hook being inserted, as shown in dotted lines, Fig. 1, is brought down toward the shaft, and acts as a cam, depressing the spring until the position represented in full lines, Fig. 1, is reached, when the spring, having returned from its depression, bears against the flat surface of the hook and keeps it in place in engagement with the cross-bar of the socket.

The simplicity of construction and the facility with which the parts are engaged and disengaged are the advantages of our device.

Having thus described our invention, what we claim as new, and desire to secure by Letters Patent, is—

The open hook $a$ and the socket B, with a cross-bar, $b$, said hook and socket being adapted to each other, substantially as herein shown and described, and forming, in connection with a spring, $c$, an improved hold-back attachment, for the purpose set forth.

To the above specification of our invention we have signed our names this 18th day of May, 1871.

JAMES THORNTON.
EMMIT G. LATTA.

Witnesses:
JAMES GRAHAM,
E. M. ARMSTRONG.

(31)